US006757746B2

(12) United States Patent
Boucher et al.

(10) Patent No.: US 6,757,746 B2
(45) Date of Patent: Jun. 29, 2004

(54) OBTAINING A DESTINATION ADDRESS SO THAT A NETWORK INTERFACE DEVICE CAN WRITE NETWORK DATA WITHOUT HEADERS DIRECTLY INTO HOST MEMORY

(75) Inventors: Laurence B. Boucher, Saratoga, CA (US); Stephen E. J. Blightman, San Jose, CA (US); Peter K. Craft, San Francisco, CA (US); David A. Higgen, Saratoga, CA (US); Clive M. Philbrick, San Jose, CA (US); Daryl D. Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 669 days.

(21) Appl. No.: 09/789,366

(22) Filed: Feb. 20, 2001

(65) Prior Publication Data

US 2001/0047433 A1 Nov. 29, 2001

Related U.S. Application Data

(63) Continuation-in-part of application No. 09/464,283, filed on Dec. 15, 1999, now Pat. No. 6,427,173, which is a continuation of application No. 09/439,603, filed on Nov. 12, 1999, now Pat. No. 6,247,060, which is a continuation of application No. 09/067,544, filed on Apr. 27, 1998, now Pat. No. 6,226,680, application No. 09/789,366, filed on Feb. 20, 2001, which is a continuation-in-part of application No. 09/748,936, filed on Dec. 26, 2000, now Pat. No. 6,334,153, which is a continuation-in-part of application No. 09/692,561, filed on Oct. 18, 2000, which is a continuation-in-part of application No. 09/675,700, filed on Sep. 29, 2000, which is a continuation-in-part of application No. 09/675,484, filed on Sep. 29, 2000, which is a continuation-in-part of application No. 09/514,425, filed on Feb. 28, 2000, now Pat. No. 6,427,171, which is a continuation-in-part of application No. 09/416,925, filed on Oct. 13, 1999, now Pat. No. 6,470,415, which is a continuation-in-part of application No. 09/384,792, filed on Aug. 27, 1999, now Pat. No. 6,434,620, which is a continuation-in-part of application No. 09/141,713, filed on Aug. 28, 1998, now Pat. No. 6,389,479.
(60) Provisional application No. 60/061,809, filed on Oct. 14, 1997, now abandoned, and provisional application No. 60/098,296, filed on Aug. 27, 1998.

(51) Int. Cl.[7] .................................................. G06F 15/16
(52) U.S. Cl. ........................ 709/250; 709/245; 711/220
(58) Field of Search ................................. 709/250, 230, 709/231, 228, 243, 236, 225, 245; 711/154, 220

(56) References Cited

U.S. PATENT DOCUMENTS 4,366,538 A    12/1982   Johnson et al. ............. 364/200

(List continued on next page.)

FOREIGN PATENT DOCUMENTS

WO    WO98/19412    5/1998

(List continued on next page.)

OTHER PUBLICATIONS

Internet pages entitled: DART Fast Application—Level Networking Via Data–Copy Avoidance, by Robert J. Walsh, printed Jun. 3, 1999.

(List continued on next page.)

*Primary Examiner*—Zarni Maung
(74) *Attorney, Agent, or Firm*—T. Lester Wallace; Mark Lauer; Silicon Edge Law Group LLP

(57) ABSTRACT

A Network Interface device (NI device) coupled to a host computer receives a multi-packet message from a network (for example, the Internet) and DMAs the data portions of the various packets directly into a destination in application memory on the host computer. The address of the destination is determined by supplying a first part of the first packet to an application program such that the application program returns the address of the destination. The address is supplied by the host computer to the NI device so that the NI device can DMA the data portions of the various packets directly into the destination. In some embodiments the NI device is an expansion card added to the host computer, whereas in other embodiments the NI device is a part of the host computer.

20 Claims, 3 Drawing Sheets

U.S. PATENT DOCUMENTS

| | | | |
|---|---|---|---|
| 4,991,133 A | 2/1991 | Davis et al. | 364/900 |
| 5,056,058 A | 10/1991 | Hirata et al. | 364/900 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,548,730 A | 8/1996 | Young et al. | 395/280 |
| 5,566,170 A | 10/1996 | Bakke et al. | 370/60 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,692,130 A | 11/1997 | Shobu et al. | 395/200.12 |
| 5,699,317 A | 12/1997 | Sartore et al. | 395/230.06 |
| 5,701,434 A | 12/1997 | Nakagawa | 395/484 |
| 5,701,516 A | 12/1997 | Cheng et al. | 395/842 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpice | 711/149 |
| 5,809,328 A | 9/1998 | Nogales et al. | 395/825 |
| 5,812,775 A | 9/1998 | Van Seters et al. | 395/200.43 |
| 5,815,646 A | 9/1998 | Purcell et al. | 395/163 |
| 5,878,225 A | 3/1999 | Bilansky et al. | 395/200.57 |
| 5,913,028 A | 6/1999 | Wang et al. | 395/200.33 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,299 A | 11/1999 | Radogna et al. | 370/392 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry, Jr. | 709/303 |
| 6,026,452 A | 2/2000 | Pitts | 710/56 |
| 6,034,963 A | 3/2000 | Minami et al. | 370/401 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,111,673 A * | 8/2000 | Chang et al. | 398/79 |
| 6,141,705 A | 10/2000 | Anand et al. | 710/15 |
| 6,173,333 B1 | 1/2001 | Jolitz et al. | |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,345,301 B1 | 2/2002 | Burns et al. | 709/230 |
| 6,356,951 B1 | 3/2002 | Gentry, Jr. | 709/250 |
| 6,389,468 B1 | 5/2002 | Muller et al. | 709/226 |
| 6,427,169 B1 | 7/2002 | Elzur | 709/224 |
| 6,427,173 B1 * | 7/2002 | Boucher et al. | 709/238 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,502,144 B1 * | 12/2002 | Accarie | 710/8 |
| 6,570,884 B1 * | 5/2003 | Connery et al. | 370/419 |
| 6,657,757 B1 * | 12/2003 | Chang et al. | 370/471 |
| 6,658,480 B2 * | 12/2003 | Boucher et al. | 709/239 |
| 6,678,283 B1 * | 1/2004 | Teplitsky | 370/463 |
| 2001/0004354 A1 | 1/2001 | Jolitz | |
| 2001/0025315 A1 | 1/2001 | Jolitz | |

FOREIGN PATENT DOCUMENTS

| | | |
|---|---|---|
| WO | WO98/50852 | 11/1998 |
| WO | WO99/04343 | 1/1999 |
| WO | WO 99/65219 | 12/1999 |
| WO | WO 00/13091 | 3/2000 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 6/2001 |

OTHER PUBLICATIONS

Internet pages of InterProphet entitled: Frequently Asked Questions, by Lynne Jolitz, printed Jun. 14, 1999.

Internet pages entitled: Technical White Paper—Xpoint's Disk–to–LAN Acceleration Solution for Windows NT Server, printed Jun. 5, 1997.

Jato Technologies Internet pages entitled: Network Accelerator Chip Architecture, twelve–slide presentation, printed Aug. 19, 1998.

EETIMES article entitled: Enterprise System Uses Flexible Spec, by Christopher Harrer and Pauline Shulman, dated Aug. 10, 1998, Issue 1020, printed Nov. 25, 1998.

Internet pages entitled: iReady About Us and iReady Products, printed Nov. 25, 1998.

Internet pages entitled: Smart Ethernet Network Interface Card, which Berend Ozceri is developing, printed Nov. 25, 1998.

Internet pages entitled : Hardware Assisted Protocol Processing, which Eugene Feinberg is working on, printed Nov. 25, 1998.

Internet pages of XaQti Corporation entitled: Giga POWER Protocol Processor Product Preview, printed Nov. 25, 1998.

Internet pages of Xpoint Technologies www.xpoint.com web site (5 pages), printed Dec. 19, 1997.

Internet pages relating to iReady Corporation and the iReady Internet Tuner Module, printed Nov. 2, 1998.

Internet pages entitled: Asante and 100BASE–T Fast Ethernet, printed May 27, 1997.

Internet pages entitled: A Guide to the Paragon XP/S–A7 Supercomputer at Indiana University, printed Dec. 21, 1998.

60/053,240 (U.S. Provisional Application), by Julie et al. (listed filing date Jul. 18, 1997).

Zilog Product Brief entitled "Z85C30 CMOS SCC Serial Communication Controller", Zilog Inc., 3 pages (1997).

Richard Stevens, "TCP/IP Illustrated, vol. 1, The Protocols", pp. 325–326 (1994).

Andrew Tanenbaum, "Computer Networks", Third Edition, ISBN 0–13–349945–6, entire book (1996).

Form 10–K for Exelan, Inc., for the fiscal year ending Dec. 31, 1987 (10 pages).

Form 10–K for Exelan, Inc., for the fiscal year ending Dec. 31, 1988 (10 pages).

Article from Rice University entitled "LRP: A New Network Subsystem Architecture for Server Systems", by Peter Druschel and Gaurav Banga, Rice University, Oct. 1996, 15 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

Internet web pages from "Adaptec.com" website directed to the Adaptec's AEA–7110C iSCSI Host Bus Adapter and other Adaptec topics, 11 pages, printed Oct. 1, 2001.

Internet web pages from "iSCSI hba.com" website directed to JNI's iSCSI HBAs including the "FCE–3210/6410", 6 pages, printed Oct. 1, 2001.

Internet web pages from "iSCSI Storage.com" website that mention an Emulex HBA, 2 pages, printed Oct. 1, 2001.

Internet web pages from the "iSCSI hba.com" website that mention QLogic HBAs including the "SANblade 2300 Series", 8 pages, printed Oct. 1, 2001.

"Two–Way TCP Traffic Over Rate Controlled Channels: Effects and Analysis", by Kalampoukas et al., IEEE Transactions on Networking, vol. 6, No. 6, 17 pages, Dec. 1998.

Iready News Archives, Toshiba Delivers First Chips to Make Consumer Devices Internet–Ready Based On IReady Design, 3 pages, printed Nov. 2, 1998.

Article by D. Hitz, et al., "File System Design For An NFS File Server Appliance", 13 pages, 1996.

Adaptec Press Release, "Adaptec Announces EtherStorage Technology", 2 pages, May 4, 2000, printed Jun. 14, 2000.

Adaptec article, "EtherStorage Frequently Asked Questions," 5 pages, printed Jul. 19, 2000.

Adaptec article, "EtherStorage White Paper," 7 pages, printed Jul. 19, 2000.

U.S. patent application Ser. No. 08/964,304, R. Napolitano et al., filed Nov. 4, 1997.

CIBC World Markets article by J. Berlino et al., "Computers; Storage", 9 pages, dated Aug. 7, 2000.

Merrill Lynch article by S. Milunovich, "Storage Futures", 22 pages, dated May 10, 2000.

Internet–draft of J. Satran, et al., "SCSI/TCP (SCSI over TCP)", 38 pages, dated Feb. 2000.

Article by S. Taylor, "Montreal Start–Up Battles Data Storage Bottleneck," 2 pages, dated Mar. 5, 2000.

Internet pages from webiste http://www.iReady co. com/about.html, 3 pages, downloaded Nov. 25, 1998.

IReady News Archives, "Revolutionary Approach to Consumer Electronics Internet Connectivity Funded", San Jose, CA, 2 pages, Nov. 20, 1997.

IReady News Archives, "Seiko Instruments, Inc. (SII) Introduces World's First Internet—Ready Intelligent LCD Modules Based on IReady Technology", 2 pages, Oct. 26, 1998.

NEWSwatch–IReady Internet Tuner to Web Enable Devices, Nov. 5, 1996, 2 pages, printed Nov. 2, 1998.

David Lammers, EEtimes, Jun. 13, 1997, "Tuner for Toshiba, Toshiba Taps iReady for Internet Tuner", 3 pages, printed Nov. 2, 1998.

Internet pages entitled: Comparison of Novell Netware and TCP/IP Protocol Architectures, by Janique Carbone, Jul. 16, 1995, 19 pages, printed Apr. 10, 1998.

VT8501 Apollo MVP4 Documentation, VIA Technologies, Inc., pp. i–iv, 1–11, cover and copyright page, revision 1.3 (Feb. 1, 2000).

Internet pages entitled: Northridge/Southbridge vs. Intel Hub Architecture, 4 pages, printed Feb. 19, 2001.

Internet pages directed to; Technical Brief on Alteon Ethernet Gigabit NIC technology, www.alteon.com, 14 pages, printed Mar. 15, 1997.

Internet pages entitled: Technical White Paper, Xpoint's Disk–to–Lan Acceleration Solution for Windows NT Server, pp. 1–14, printed Jun. 5, 1997.

Gigabit Ethernet Technical Brief, Achieving End–to–End Performance, 15 pages, Alteon Networks, Inc., First Edition, Sep. 1996.

Internet pages from IReady News Archives entitled, "iReady Rounding Out management team with two key executives", 2 paged, downloaded Nov. 28, 1998.

"Toshiba Delivers First Chips To Make Consumer Devices Internet–Ready Based On iReady's Design", Press Releasce Oct., 1988. 3 pages, downloaded Nov. 28, 1998.

Internet pages from iReady Products, web site http://www.ireadyco.com/products.html, 2 pages, downloaded Nov. 25, 1998.

IReady News Archives, "Toshiba, iReady shipping Internet chip", 1 page, posted at 9:39 AM PT, Oct. 14, 1998.

IReady Corporation, The i–1000 Internet Tuner, Modular Internet Design System, 2 pages, date unknown.

Interprophet website, http://www.interprophet.com/technology.html, 17 pages, downloaded Mar. 1, 2000.

* cited by examiner

OBTAINING A DESTINATION ADDRESS SO THAT A NETWORK INTERFACE DEVICE CAN WRITE NETWORK DATA WITHOUT HEADERS DIRECTLY INTO HOST MEMORY

CROSS-REFERENCE TO RELATED APPLICATIONS

This application is a continuation-in-part of and claims the benefit under 35 U.S.C. §120 of U.S. patent application Ser. No. 09/464,283, filed Dec. 15, 1999, now U.S. Pat. No. 6,427,173, which in turn claims the benefit under 35 U.S.C. §120 of U.S. patent application Ser. No. 09/439,603, filed Nov. 12, 1999, now U.S. Pat. No. 6,247,060 which in turn claims the benefit under 35 U.S.C. §120 of U.S. patent application Ser. No. 09/067,544, filed Apr. 27, 1998, now U.S. Pat No. 6,226,680 which in turn claims the benefit under 35 U.S.C. §119(e) of the Provisional Application Serial No. 60/061,809, filed Oct. 14, 1997, now abandoned This application also claims benefit under 35 U.S.C. §120 of the following U.S. patent applications: Ser. No. 09/748, 936, filed Dec. 26, 2000; , now U.S. Pat. No. 6,334,153 Ser. No. 09/692,561, filed Oct. 18, 2000; Ser. No. 09/675,700, filed Sep. 29, 2000; Ser. No. 09/675,484, filed Sep. 29, 2000; Ser. No. 09/514,425, filed Feb. 28, 2000, now U.S. Pat. No. 6,427,171 Ser. No. 09/464,283, filed Dec. 15, 1999; Ser. No. 09/416,925, now U.S. Pat.No. 6,427,173 filed Oct. 13, 1999; Ser. No. 09/384,792, filed Aug. 27, 1999, now U.S. Pat. No. 6,470,715 and Ser. No. 09/141,713, filed Aug. 28, 1998, now U.S. Pat No. 6,389,479. This application also claims the benefit under 35 U.S.C. §119 of Provisional Application Serial No. 60/098,296, filed Aug. 27, 1998.

The complete disclosures of: U.S. patent application Ser. No. 09/464,283; U.S. patent application Ser. No. 09/439, 603; U.S. patent application Ser. No. 09/067,544; U.S. patent application Ser. No. 09/748,936; U.S. patent application Ser. No. 09/692,561; U.S. patent application Ser. No. 09/675,700; U.S. patent application Ser. No. 09/675,484; U.S. patent application Ser. No. 09/514,425; U.S. patent application Ser. No. 09/416,925; U.S. application Ser. No. 09/384,792; U.S. application Ser. No. 09/141,713 and Provisional Application Serial Nos. 60/061,809 and 60/098,296 are incorporated herein by reference.

TECHNICAL FIELD

The present invention relates generally to computer or other networks, and more particularly to protocol processing for information communicated between hosts such as computers connected to a network.

BACKGROUND INFORMATION

One of the most CPU intensive activities associated with performing network protocol processing is the need to copy incoming network data from an initial landing point in system memory to a final destination in application memory. This copying is necessary because received network data cannot generally be moved to the final destination until the associated packets are: A) analyzed to ensure that they are free of errors, B) analyzed to determine which connection they are associated with, and C) analyzed to determine where, within a stream of data, they belong. Until recently, these steps had to be performed by the host protocol stack. With the introduction of the intelligent network interface device (as disclosed in U.S. patent application Ser. Nos. 09/464,283, 09/439,603, 09/067,544, and U.S. Provisional Application Serial No. 60/061,809), these steps may now be performed before the packets are delivered to the host protocol stack.

Even with such steps accomplished by an intelligent network interface device, there is another problem to be addressed to reduce or eliminate data copying, and that is obtaining the address of the destination in memory and passing that address to the network interface device. Obtaining this address is often difficult because many network applications are written in such a way that they will not provide the address of the final destination until notified that data for the connection has arrived (with the use of the "select( )" routine, for example). Other attempts to obtain this address involve the modification of existing applications. One such example is the Internet Engineering Task Force (IETF) Remote DMA (RDMA) proposal, which requires that existing protocols such as NFS, CIFS, and HTTP be modified to include addressing information in the protocol headers. A solution is desired that does not require the modification of existing applications or protocols.

SUMMARY

A multi-packet message (for example, a session layer message) is to be received onto a Network Interface device (NI device) and the data payload of the message is to be placed into application memory in a host computer. The NI device receives the first packet of the message and passes a first part of this first packet to the operating system on the host. In one embodiment, the first part of the first packet includes the session layer header of the message. The operating system passes this first part of the first packet to an application program. The application program uses the first part of the first packet to identify an address of a destination in application memory where the entire data payload is to be placed. The application program returns the address to the operating system and the operating system in turn forwards the address to the NI device. The NI device then uses the address to place the data portions of the various packets of the multi-packet message into the destination in application memory. In one embodiment, the NI device DMAs the data portions of the packets from the NI device directly into the destination. In some embodiments, the NI device DMAs only data into the destination such that the destination contains the data payload in one contiguous block without any session layer header information, without any transport layer header information, and without any network layer header information.

In some embodiments, the NI device is an interface card that is coupled to the host computer via a parallel bus (for example, the PCI bus). In other embodiments, the NI device is integrated into the host computer. For example, the NI device may be part of communication processing device (CPD) that is integrated into the host computer.

Other structures and methods are described in the detailed description below. This summary does not purport to define the invention. The invention is defined by the claims.

DETAILED DESCRIPTION

Figure 1:
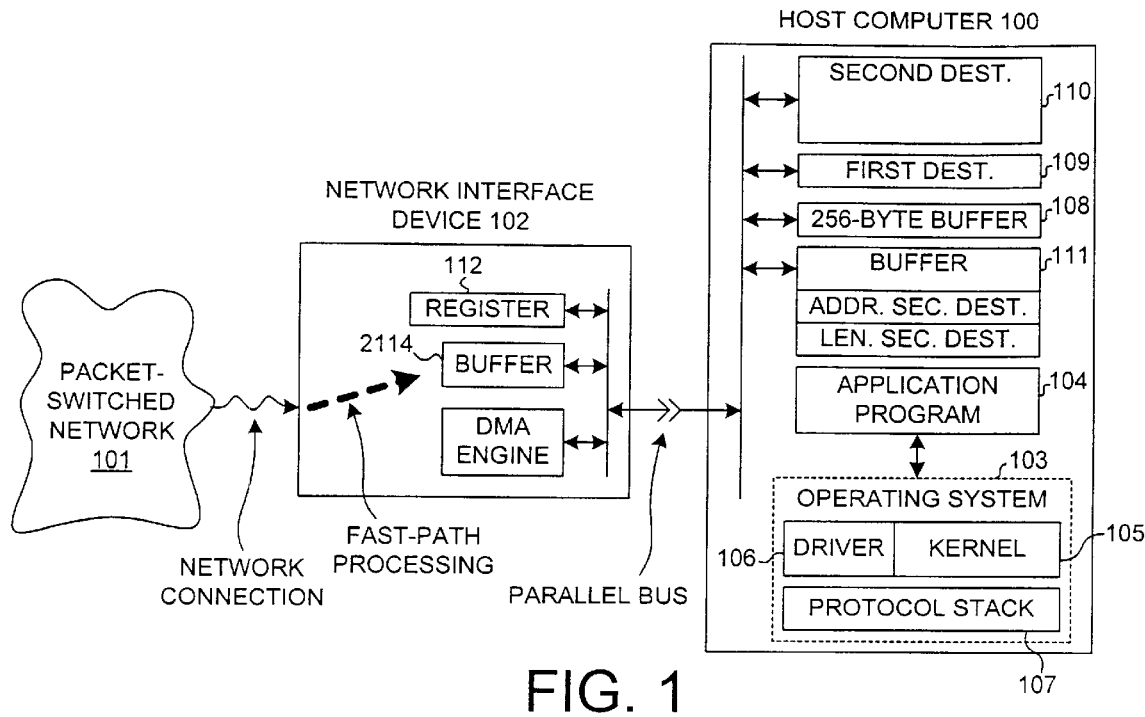
FIG. 1 is a diagram of a Network Interface Device (NI device) in accordance with an embodiment of the present invention. The NI device performs fast-path processing on information passing from a packet-switched network (for example, the Internet), through the NI device, and to a host computer.

FIG. 1 is a diagram of a host computer 100 that is coupled to a packet-switched network 101 (for example, the Internet) via a Network Interface (NI) device 102. In the illustrated example, host computer 100 is an Intel x86-based system (for example, Compaq Proliant). Software executing on host computer 100 includes: 1) a Linux operating system 103, and 2) an application program 104 by the name of "Samba". Operating system 103 includes a kernel 105. Kernel 105 includes: 1) driver software 106 for interfacing to and controlling NI device 102, and 2) a protocol stack 107. A part of protocol stack 107 is specially customized to support the NI device 102.

In one specific embodiment, NI device 102 is the Intelligent Network Interface Card (INIC) of FIGS. 21 and 22 of U.S. patent application Ser. No. 09/464,283 (the entire disclosure of Ser. No. 09/464,283 is incorporated herein by reference). The NI device 102 in this specific embodiment is an expansion card that plugs into a card edge connector on the host computer (for example, a personal computer). The card includes an application specific integrated circuit (ASIC) (for example, see ASIC 400 of FIG. 21 of U.S. application Ser. No. 09/464,283) designed by Alacritech, Inc. of 234 East Gish Road, San Jose, Calif. 95112. The card performs "fast-path processing" in hardware as explained in U.S. application Ser. No. 09/464,283. An INIC card (Model Number 2000–100001 called the "Alacritech 100×2 Dual-Server Adapter") is available from Alacritech, Inc. of 234 East Gish Road, San Jose, Calif. 95112.

Figure 2:
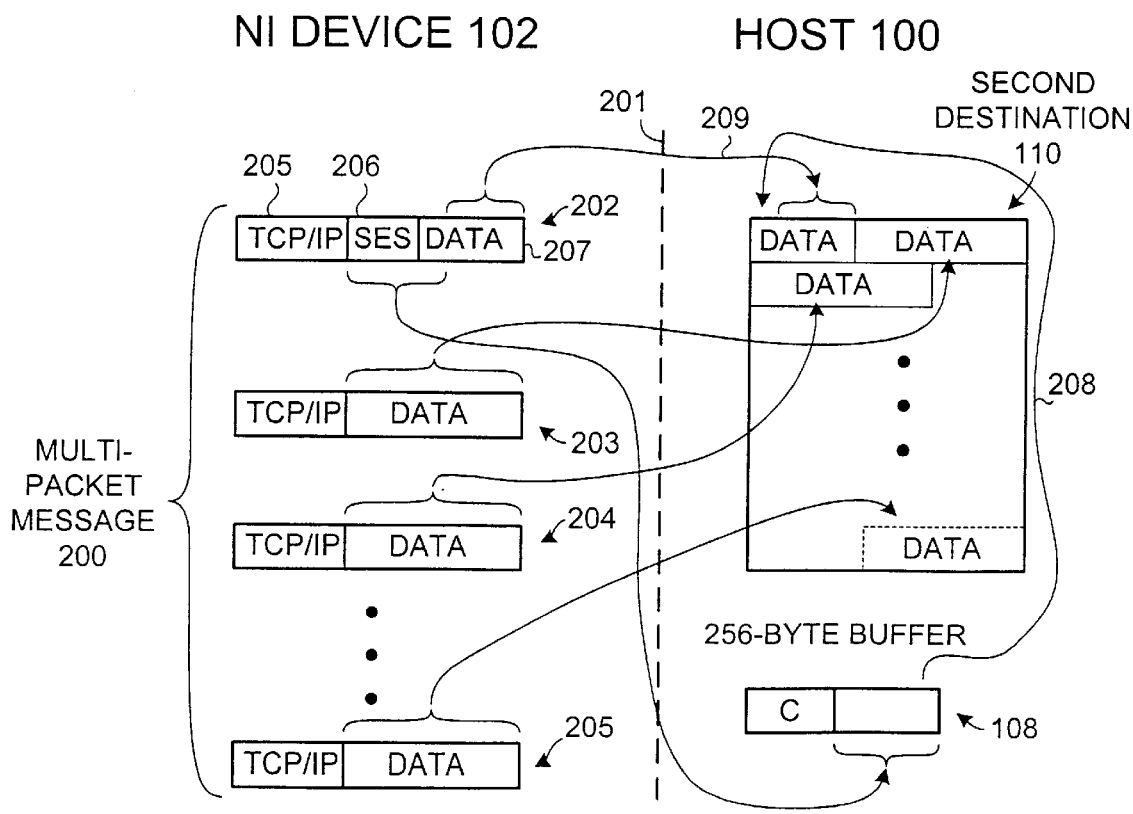
FIG. 2 is a diagram that illustrates a method in accordance with an embodiment of the present invention where network data from a multi-packet session message is transferred by the NI device directly into a destination in a host computer.

FIG. 2 is a diagram illustrating the transfer of data in a multi-packet session layer message 200 from a buffer 2114 (see FIG. 1) in NI device 102 to a second destination 110 in memory in host computer 100. The portion of the diagram to the left of the dashed line 201 (see FIG. 2) represents NI device 102, whereas the portion of the diagram to the right of the dashed line 201 represents host computer 100. Multi-packet message 200 includes approximately forty-five packets, four of which (202–205) are labeled on FIG. 2. The first packet 202 includes a portion 205 containing transport and network layer headers (for example, TCP and IP headers), a portion 206 containing a session layer header, and a portion 207 containing data. The subsequent packets 203–205 do not contain session layer header information, but rather include a first portion containing transport and network layer headers (for example, TCP and IP headers), and a second portion containing data.

Figure 3:
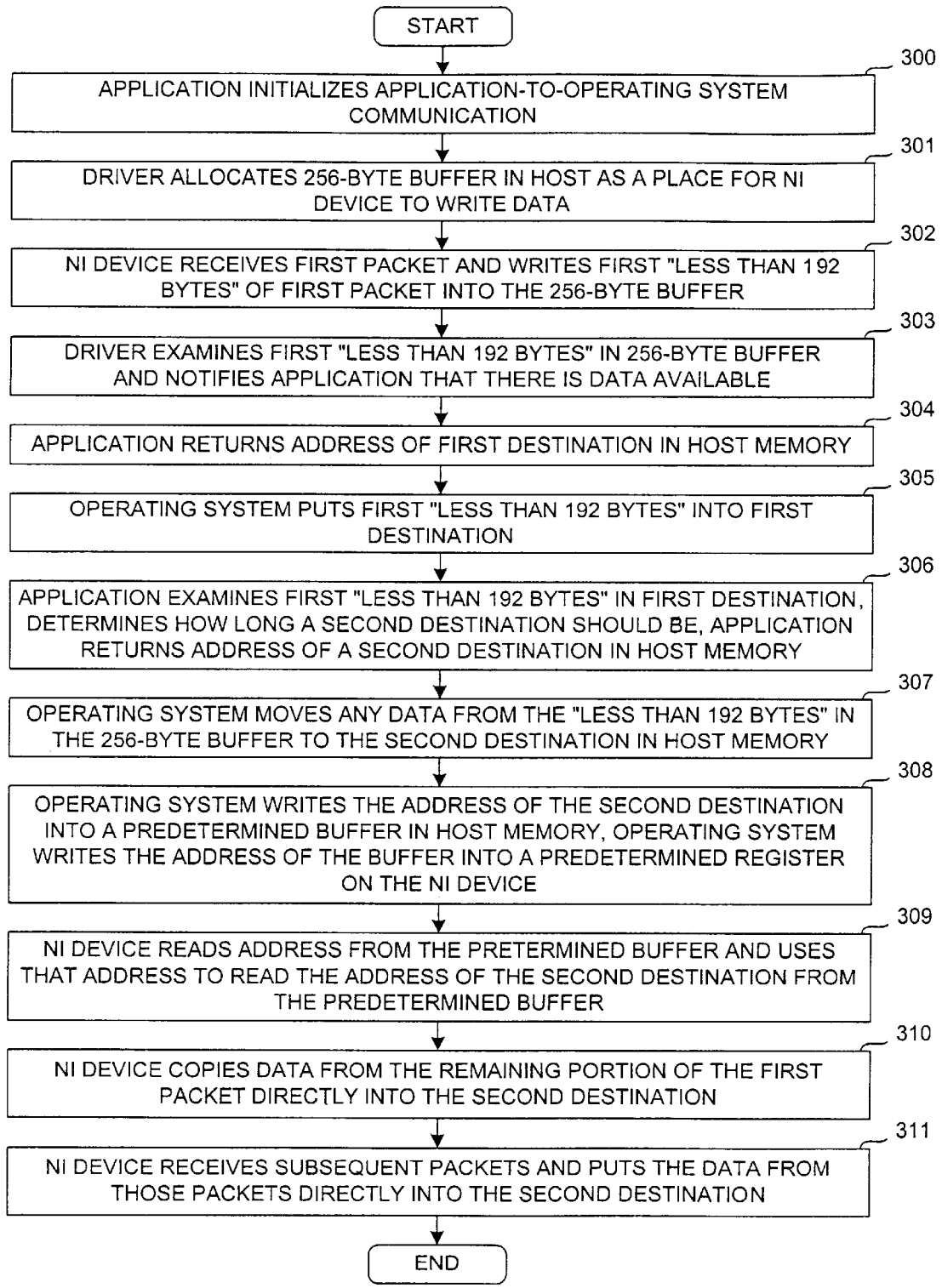
FIG. 3 is a flowchart of a method in accordance with an embodiment of the present invention.

FIG. 3 is a flowchart of a method in accordance with one specific embodiment of the present invention. In a first step (step 300), the Samba application program 104 initializes application-to-operating system communication by calling the "socket" function. The socket function causes kernel 105 to allocate a communication control block (CCB) that will be used to manage the connection. The Samba application program 104 then uses the "bind" routine to associate the socket with a particular local IP address and IP port. The Samba application program 104 then calls the "listen" routine to wait for an incoming connection to arrive from kernel 105. When an incoming connection arrives, the Samba application program 104 calls the "accept" routine to complete the connection setup. After setting up the socket, the Samba application program 104 uses the "select" routine to tell the kernel 105 to alert application 104 when data for that particular connection has arrived.

In a next step (step 301), driver 106 allocates a 256-byte buffer 108 in host memory as a place where NI device 102 can write data. Driver 106 then passes the address of 256-byte buffer 108 to NI device 102 so that NI device 102 can then use that address to write information into 256-byte buffer 108. Driver 106 does this by writing the address of 256-byte buffer 108 into a register 112 on the NI device 102. A status field at the top of the 256-byte buffer 108 contains information indicating whether the 256-byte buffer contains data (and is valid) or not.

In step (step 302), NI device 102 receives the first packet 202 of message 200 (see FIG. 2) from network 101. NI device 102 looks at the IP source address, IP destination address, TCP source port and TCP destination port and from those four values determines the connection identified with the packet. (IP is the network layer. TCP is the transport layer.) NI device 102 then: 1) writes a unique identifier that identifies the connection into a designated field in the 256-byte buffer 108; 2) writes the first 192 bytes of the first packet into the 256-byte buffer (the MAC, IP and TCP headers are not written to the 256-byte buffer); 3) sets the status field of 256-byte buffer 108 to indicate that the 256-byte buffer is full; and 4) interrupts the kernel 105.

In a next step (step 303), kernel 105 responds by having the driver 106 look at the status field of the 256-byte buffer 108. If the status field indicates 256-byte buffer 108 is full and valid, then driver 106 passes the address of 256-byte buffer 108 to protocol stack 107. The first part of this 192 bytes is session layer header information, whereas the remainder of the 192 bytes is session layer data. Protocol stack 107 notifies application program 104 that there is data for the application program. Protocol stack 107 does this by making a call to the "remove_wait_queue" routine.

In a next step (step 304), the Samba application program 104 responds by returning the address of a first destination 109 in host memory. The Samba application program 104 does this by calling a socket routine called "recv". The "recv" socket routine has several parameters: 1) a connection identifier that identifies the connection the first destination 109 will be for, 2) an address of the first destination 109 where the data will be put, and 3) the length of the first destination 109. (In some embodiments, Samba application program 104 calls "recv" to request less than 192 bytes.) Through this "recv" socket routine, kernel 105 receives from application program 104 the address of the first destination 109 and the length of the first destination 109. Kernel 105 then gives the address of the first destination 109 to the protocol stack 107.

In a next step (step 305), the protocol stack 107 moves the requested bytes in 256-byte buffer 108 to first destination 109 identified by the address. The first destination is in memory space of the application program 104 so that application program 104 can examine the requested bytes. If the application program 104 requested less than 192 bytes using "recv", then driver 106 moves that subset of the 192 bytes to first destination 109 leaving the remainder of the 192 bytes in the 256-byte buffer. On the other hand, if the application program 104 requested all 192 bytes using "recv", then driver 106 moves the full 192 bytes to first destination 109.

In a next step (step 306), the application examines the requested bytes in first destination 109. Application program 104 analyzes the session layer header portion, determines the amount of session layer data coming in the session layer message, and determines how long a second destination 110 should be so as to contain all the remaining session layer data of message 200. Application program 104 then returns to kernel 105 the address of second destination 110 and the length of the second destination 110. Application program 104 does this by calling the socket routine "recv". Kernel 105 receives the address of second destination 110 and the length of the second destination 110 and gives that information to the protocol stack 107.

In a next step (step 307), the protocol stack 107 moves any session layer data in the 192 bytes (not session layer headers) in 256-byte buffer 108 to second destination 110 identified by the second address. This move of data is shown in FIG. 2 by arrow 208.

In a next step (step 308), the protocol stack 107 writes the address of second destination 110 and the length of second destination 110 into a predetermined buffer 111 in host memory. Driver 106 then writes the address of predetermined buffer 111 to a predetermined register 112 in NI device 102.

In a next step (step 309), NI device 102 reads the predetermined register 112 and retrieves the address of predetermined buffer 111. Using this address, NI device 102 reads the predetermined buffer 111 by DMA and retrieves the address of second destination 110 and the length of second destination 110.

In some embodiments, the second destination 110 is actually made up of a plurality of locations having different addresses of different lengths. The application program supplies a single virtual address for the NI device 102 to read (such as explained in step 310), but this virtual address is made up of many different physical pages. Driver 106 determines the addresses of the pages that are associated with this virtual address and passes these physical addresses and their lengths to NI device 102 by placing the addresses in predetermined buffer 111 and writing the address of predetermined buffer 111 to predetermined register 112 in NI device 102.

In a next step (step 310), NI device 102 transfers the data from the remaining portion of first packet 202 (without any session layer headers, and without any TCP or IP headers) directly into second destination 110 using DMA. In this example, the transfer is made across a parallel data bus (for example, across a PCI bus by which the NI device 102 is coupled to the host computer 100). This move of data is shown in FIG. 2 by arrow 209.

In a next step (step 311), subsequent packets are received onto NI device 102. For each packet, NI device 102 removes the TCP and IP headers and writes the remaining data (without session layer headers, TCP headers, or IP headers) directly to second destination 110 using DMA (for example, NI device 102 may write the data directly into the second destination across the PCI bus by which the NI device 102 is coupled to the host computer 100). The data from the many packets of the session layer message is written into second destination 110 such that there are no session layer headers, transport layer headers, or network layer headers between the data portions from the various packets of message 200.

In the above described specific embodiment, there is no session layer header, transport layer header, or network layer header between the data portions from the various packets of message 200 as the data portions are deposited into the second destination 110. This need not be the case, however.

In some embodiments, session layer header information does appear in second destination 110. This is so because it is the application program that determines the length of the second destination 110.

In some embodiments, application program 104 returns a first destination that is larger than 192 bytes. In that case, there is no different second destination. The entire 192 bytes contained in the 256-byte buffer is moved to the first destination. The address of the remainder is given to the NI device as described above with respect to the second destination.

Figure 4:
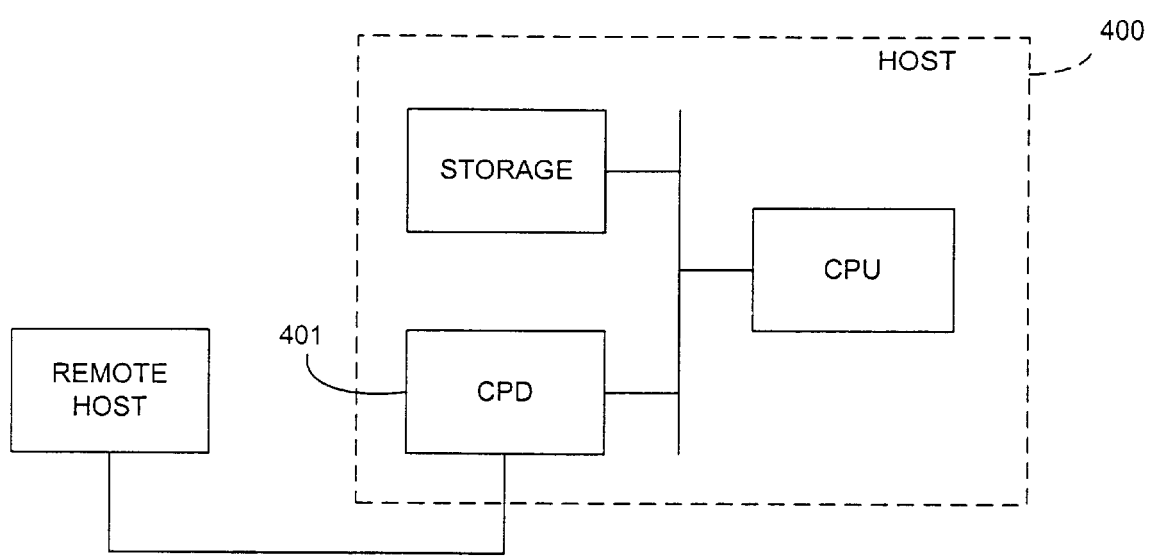
FIG. 4 shows an NI device integrated into a host computer.

Although the NI device may be realized on an expansion card and interfaced to the host computer via a bus such as the PCI bus, the NI device can also be integrated into the host computer. For example, the NI device in some embodiments is disposed on the motherboard of the host computer and is substantially directly coupled to the host CPU. The NI device may, for example, be integrated into a memory controller integrated circuit or input/output integrated circuit that is coupled directly to the local bus of the host CPU. The NI device may be integrated into the Intel 82815 Graphics and Memory Controller Hub, the Intel 440BX chipset, or the Apollo VT8501 MVP4 Northbridge chip. FIG. 4 shows an NI device integrated into a host computer 400 in the form of a communication processing device (CPD) 401.

Although the present invention is described in connection with certain specific embodiments for instructional purposes, the present invention is not limited thereto. Advantages of the present invention may be realized wherein either no header information or just an insubstantial amount of header information is transferred from the network interface device into the second destination. All the data from the session layer message may be deposited into a single contiguous block of host memory (referred to as a destination) in some embodiments or may be deposited into several associated blocks (that together are referred to as a destination) of host memory in other embodiments. Accordingly, various modifications, adaptations, and combinations of various features of the described embodiments can be practiced without departing from the scope of the invention as set forth in the claims.

What is claimed is:

1. A method of transferring data of a message from a network interface device into a host memory of a host computer, the host computer having an operating system, the network interface device being coupled to receive the message from a packet-switched network, the network interface device being coupled such that the network interface device can write into the host memory, the message consisting of a first packet and a plurality of subsequent packets, each of the plurality of subsequent packets containing a header portion and a data portion, the method comprising:

(a) the network interface device supplying at least a portion of the first packet to the operating system of the host computer, the operating system using the at least a portion of the first packet to obtain a destination in the host memory for the data of the message, the operating system obtaining this destination without being supplied by the network interface device any portion of any of the subsequent packets, the operating system communicating an indication of the destination to the network interface device; and (b) the network interface device using the indication of the destination to write the data portion of each of the plurality of subsequent packets into the destination in the host memory, the network interface device writing the data portions from the plurality of subsequent packets into the destination without writing a header portion of any of the subsequent packets into the destination.

2. The method of claim 1, wherein the network interface device is a part of the host computer.

3. The method of claim 1, wherein the network interface device is an intelligent network interface card (INIC) that is added to the host computer, the INIC being coupled to the host computer by a PCI bus, the INIC using the PCI bus to write the data portions of the packets into host memory in (b).

4. A method of transferring data of a message from a network interface device to a host computer, the network interface device being coupled to receive the message from a packet-switched network, the network interface device being coupled to the host computer such that the network interface device can write into a host memory on the host computer, the message consisting of a first packet and a plurality of subsequent packets, each of the plurality of subsequent packets containing a header portion and a data portion, the method comprising:
  (a) transferring at least a portion of the first packet from the network interface device to the host computer, the host computer using the at least a portion of the first packet to allocate a destination in the host memory for the data of the message, the host computer doing this allocation without receiving from the network interface device any portion of any of the subsequent packets, the host computer communicating an indication of the destination to the network interface device; and
  (b) the network interface device using the indication of the destination to write the data portion of each of the plurality of subsequent packets from the network interface device directly into the destination, the network interface device writing the data portions from the plurality of subsequent packets into the destination without writing a header portion of any of the subsequent packets into the destination.

5. The method of claim 4, wherein the message is a session layer message, the host computer including a protocol stack capable of performing network layer and transport layer processing, the host computer performing no network layer or transport layer processing of the packets of the session layer message.

6. The method of claim 5, wherein a portion of the first packet but not all of the first packet is transferred in (a).

7. The method of claim 5, wherein the first packet contains a header portion and a data portion, wherein a first portion of the data portion of the first packet is transferred in (a) but wherein a second portion of the data portion of the first packet is not transferred in (a).

8. The method of claim 5, wherein the network interface device is coupled to the host computer via a parallel bus, the writing of the data portions in (b) being done across the parallel bus.

9. The method of claim 4, wherein the indication of the destination in (a) is an address.

10. A method for communicating a message from a packet-switched network, through a network interface device, and to a host computer, the message comprising a plurality of packets, each of the plurality of packets comprising a data portion, the host computer having a memory, the network interface device being coupled to the host computer such that the network interface device can write to the memory of the host computer, the method comprising:
  (a) passing a first part of the first packet of the message from the network interface device to a buffer in the memory of the host computer, a first part of the first packet including a first part of the data portion of the first packet, a second part of the data portion of the first packet not being passed from the network interface device to the buffer;
  (b) passing from the host computer to the network interface device an indication of a destination in the memory of the host computer where data from the message is to be placed;
  (c) the host computer transferring the first part of the data portion of the first packet from the buffer to the destination;
  (d) the network interface device using the indication of the destination to transfer the second part of the data portion of the first packet from the network interface device to the destination without the second part of the data portion being written into the buffer; and
  (e) the network interface device using the indication of the destination to transfer the data portions of the rest of the plurality of packets from the network interface device to the destination without the data portions being written into the buffer.

11. The method of claim 10, wherein the host computer involves a protocol stack capable of performing network layer and transport layer processing, the host computer performing no network layer or transport layer processing of any packet of the message.

12. The method of claim 11, wherein the first packet contains a header portion and a data portion, wherein a first portion of the data portion of the first packet is transferred in (a) but wherein a second portion of the data portion of the first packet is not transferred in (a).

13. The method of claim 11, wherein the network interface device is coupled to the host computer via a parallel bus, the transferring of data portions in (e) being done across the parallel bus.

14. The method of claim 10, wherein the indication of the destination in (b) is an address.

15. A system, comprising:
  a host computer comprising: host memory, an operating system and an application program, the application program identifying a destination in the host memory where data from a message is to be placed, the message comprising a plurality of packets, each of the packets comprising a header portion and a data portion; and
  a network interface device coupled to a packet-switched network and coupled to the host computer, the network interface device being coupled to the host computer by a parallel bus, the network interface device receiving the packets of the message and placing the data portions of the packets of the message into the destination in host memory, the network interface device placing the data portions into the destination without placing any of the header portions into the destination.

16. The system of claim 15, wherein the message comprises a first packet and a plurality of subsequent packets, at least a portion of the first packet being supplied to the application program and no portion of any subsequent packet being supplied to the application program such that the application program responds by supplying an indication of the destination, the indication of the destination being supplied to the network interface device, the network interface device using the indication of the destination to write data from the plurality of subsequent packets into the destination.

17. The system of claim 15, wherein the message is a session layer message, and wherein the operating system includes a protocol stack, the protocol stack being capable of performing transport layer and network layer processing, and wherein the network interface device comprises:

means for performing fast-path processing such that the network interface device places the data portions of the packets of the session layer message into the destination on the host computer without the protocol stack of the host computer doing any transport layer or network layer processing of any of the packets in the session layer message, the means also being for facilitating slow-path processing on a second session layer message such that the protocol stack of the host computer does transport layer and network layer processing on packets of the second session layer message.

18. A method of transferring data of a message from a network interface device to a host computer, the network interface device being coupled to receive the message from a packet-switched network, the network interface device being coupled to the host computer such that the network device can write into a host memory on the host computer, the message consisting of a first packet and a plurality of subsequent packets, the first packet including at least a session layer header, each of the plurality of subsequent packets containing a header portion and a data portion, the method comprising:

transferring, from the network interface device to the host computer, at least a portion of the first packet including at least the session layer header;

allocating, by the host computer processing the at least a portion of the first packet, a destination in the host memory for the data of the message;

communicating, from the host computer to the network interface device, an indication of the destination to the network interface device; and writing, by the network interface device in accordance with the indication, the data portion of each of the plurality of subsequent packets from the network interface device into the destination, without writing a header portion of any of the subsequent packets into the destination.

19. The method of claim 18, wherein communicating an indication of the destination to the network interface device includes diverting the indication from being stored in a memory of the host computer.

20. The method of claim 18, wherein transferring at least a session layer header of the first packet includes transferring, from the network interface device to the host computer, a data portion of the first packet.

* * * * *